United States Patent [19]

Weinhaus

[11] 4,318,462
[45] Mar. 9, 1982

[54] CONTACT RAIL BRACKET

[75] Inventor: Harold R. Weinhaus, Southfield, Mich.

[73] Assignee: The Budd Company, Troy, Mich.

[21] Appl. No.: 176,613

[22] Filed: Aug. 8, 1980

[51] Int. Cl.³ .............................................. B60M 1/04
[52] U.S. Cl. ........................................ 191/30; 191/32
[58] Field of Search ................... 191/30, 31, 32, 25; 238/379

[56] References Cited

U.S. PATENT DOCUMENTS 1,877,460 9/1932 Hocher .................................. 191/32
3,927,742 12/1975 Reynolds .............................. 191/30

Primary Examiner—Richard A. Schacher
Attorney, Agent, or Firm—A. L. Trueax, Jr.

[57] ABSTRACT

A bracket for supporting a cover structure for the contact rail of electric railroads which is made of plastic materials and in which the supporting bracket for the cover structure is so formed that it has a substantially uniform cross sectional thickness and forms a channel opening away from the rail which facilitates manufacture and reduces weight.

8 Claims, 6 Drawing Figures

U.S. Patent  Mar. 9, 1982  4,318,462
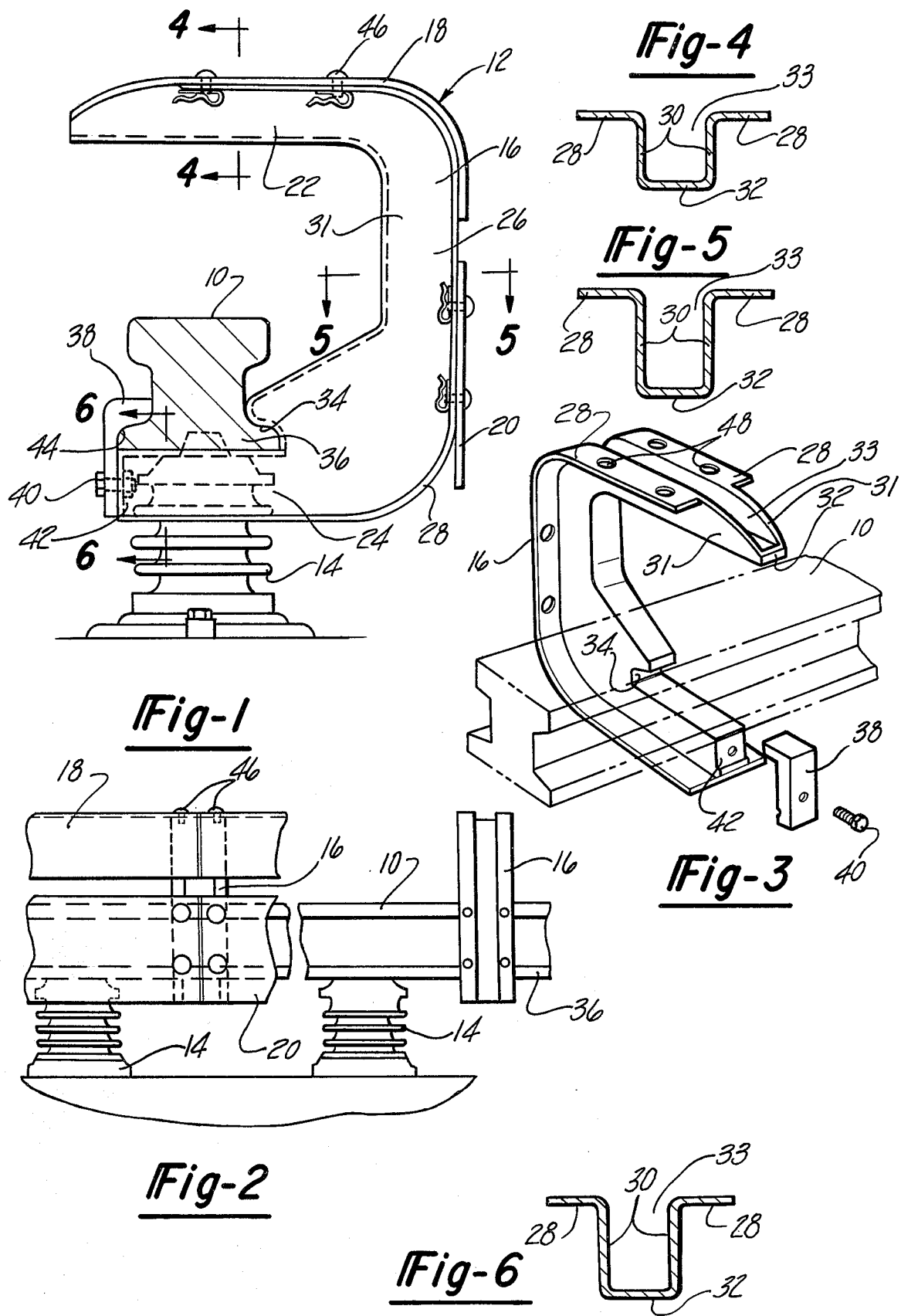

CONTACT RAIL BRACKET

This invention relates to electric railroads and more particularly to a cover structure for the contact rail of such railroads.

It is very desirable to provide a guard or cover for the contact rail or third rail of electric railroads of the type wherein an electrical conductor is formed by a third rail that is supported on insulators relative to the ground and is disposed between the parallel wheel engaging rails. It is desirable that such rails be shielded as much as possible to prevent accidental contact by personnel or foreign objects and at the same time must permit engagement by the contact mechanism associated with the drive motor for the electrical locomotive. Also, since such covers must extend for many miles, it is desirable that the structures afford the necessary protection and at the same time be economical.

It is an object of the invention to provide a cover structure wherein a cover is supported relative to the contact rail of an electric railroad by brackets made of plastic material.

Another object of the invention is to provide a cover structure for the contact rail of an electric railroad which affords the required strength and at the same time requires a minimum of material which reduces costs.

Still another object of the invention is to provide a cover structure in which the bracket supporting the cover can be made in a two part, relatively simple molding structure in which the mold parts move toward and away from each other in a molding press without requiring inserts or other complex accessories.

Yet another object of the invention is to provide a cover structure in which the supporting bracket has a configuration and distribution of materials which reduces the mold cycle time thereby increasing manufacturing efficiency and reducing costs.

The objects of the invention are accomplished by a cover structure in which support brackets hold a cover arrangement to protect one side and the top of the contact rail of electric railroads. The support bracket has a body member made of polymerized sheet molding compound in the form of fiberglass filaments in a matrix of polymerized resin. The bracket member is generally C-shaped as viewed looking longitudinally of the rail with a generally U-shaped cross section with a substantially uniform wall thickness throughout the entire bracket. The U-shaped sections form a channel opening radially outwardly away from the rail. The ends of the legs of the U-shaped cross section have oppositely extending flanges which form the surfaces to which the cover may be attached. The channel also opens horizontally to one side of the rail making it possible to form the bracket in a two part mold. The cross sectional shape makes it possible to have the required strength for supporting the cover but at the same time makes it possible to use a uniform wall thickness which reduces material weight and manufacturing time making it possible to provide an economical and durable cover structure.

These and other objects of the invention will be apparent from the following description and from the drawings in which:

FIG. 1 is an elevation looking in the direction of a contact rail of an electric railroad of the cover structure and bracket embodying the invention and shown in mounted position relative to the contact rail;

FIG. 2 is a side elevation looking transversely of the contact rail with some of the cover structure broken away and removed.

FIG. 3 is a perspective view of the bracket in relation to the contact which is shown in phantom lines; and FIGS. 4, 5 and 6 are cross sectional views of the bracket for supporting a cover structure taken, respectively, on line 4—4, 5—5 and 6—6 in FIG. 1.

Referring to the drawings a cover structure for a contact rail 10 of electric railroads is designated generally at 12. The rail 10 is intended to form an electrical conductor by which electricity ca be supplied to the driving motor of an electric train running on parallel tracks on opposite sides of the contact rail 10. The contact rail 10 is supported relative to the ground by spaced insulators indicated at 14. The cover structure 12, which shields the top and one side of the rail 10, includes a plurality of brackets 16 which are attached at spaced intervals to the rail 10 and which support an upper cover 18 and a side cover 20. If desired, the cover members 18 and 20 may be made of a single piece of material to extend longitudinally in parallel relationship to the rail 10.

The cover members 18 and 20 whether made separately or as a unit are preferably formed as a pultrusion in which filaments of fiberglass are arranged generally longitudinally in a matrix of polymerized resin. The brackets 16, on the other hand, are molded of sheet molding compound typically containing filaments of fiberglass also in a matrix of resin.

The brackets 16 by which the covers 18 and 20 are held relative to the rail 10 are generally C-shaped as viewed from an end of the rail 10. The bracket 16 has an upper horizontally extended limb portion 22 and a lower limb 24 extending generally parallel to each other and connected by a vertical support portion 26.

As seen in FIGS. 4, 5 and 6, which are cross sections, respectively, of the upper limb 22, vertical support 26 and lower limb 24, the brackets 16 have a generally U-shaped cross section with oppositely extending flanges 28 which extend in opposite directions from the ends of the legs 30 of the U-shaped cross section. The legs 30 are formed by a pair of parallel C-shaped members 31 joined together by a web 32. The configuration of the bracket 16 and particularly of a channel 33 formed by the U-shaped cross section with oppositely extending flanges 28 is such that the channel opens radially outwardly away from the rail 10 and all portions of the channel 33 are open horizontally outwardly to one side of the rail 10. This makes it possible to form the brackets 16 in a two part mold since all of the mold portions occupying the channel can be moved free of the finished bracket 16 by moving that mold portion generally horizontally from the bracket when the latter is positioned as viewed in FIG. 1.

As viewed in FIG. 1, the bracket 16 is secured to the rail 10 through the medium of clamping means which includes a notch 34 shaped to receive the lower flange 36 of rail 10. A clamp element 38 is detachably connected to the end of the lower limb portion 24 by means of a fastener 40 such as a nut and bolt passing through aligned openings in the clamp element 38 and a wall portion 42. The clamp element 38 acts with the lower limb 24 to form a notch portion 44 similar to the notch 34 to receive one edge of the lower flange 36 of the rail 10 to hold the bracket 16 in position.

In use, the brackets 16 are disposed at spaced intervals along the rail 10 and between insulators 14 to extend generally transversely to the rails with the lower limb portion 24 engaging the bottom of the rail 10 and with the upper limb 22 spaced in slightly elevated position above the top of the rail 10. The upper and lower cover members 18 and 20 may be attached to the bracket 16 by means of fasteners 46 passing through openings 48 formed in the flanges 28 of the bracket 16. Typically, the cover members 18 and 20 can be of ten foot lengths placed in end to end relationship with the adjacent ends each fastened to one of the flanges 28 to form a continuous cover member.

By forming the bracket members in this manner, it is possible to make a bracket structure with substantially uniform wall thicknesses in all portions of the brackets 16 as will be noted from an examination of the cross sections in FIGS. 4, 5 and 6. The resultant brackets 16 are of minimum weight and yet the configuration offers a substantially rigid structure to meet the requirements of mechanical loading on the cover structure 12. In addition, the configuration including the uniform wall thickness makes it possible to minimize weight and molding cycle time all of which are factors in the ultimate costs of the bracket 16.

The cover structure for the contact rail of electric railroads has been provided wherein a bracket member and the supported cover structure are made of polymerized plastic materials wherein the bracket is attached directly to the contact rail to cover the top and one side and at the same time leaving one side open to receive the contact mechanism of the electric power plant for the rail cars. The bracket members have a generally U-shaped cross section with oppositely ending flanges all of substantially uniform cross section and forming an open channel facilitating manufacture, reducing weight and manufacturing time, and thereby providing an economical cover structure.

The embodiments of the invention in which an exclusive property or privilege is claimed are defined as follows:

1. A support bracket to be clamped to the contact electrified I-beam rails of electric railroads for supporting protective covers comprising; a body member having upper and lower limbs held in vertically spaced relationship to each other by a vertical support to form a general C-shape, said body member being adapted to be disposed transversely of said rail with a lower limb in engagement with an underside of the rail and the upper limb in spaced relationship to the top of the rail, the body member having a U-shaped cross section with a channel opening radially outwardly of the rail, a pair of aligned flanges projecting in opposite directions from the ends of the legs of the U-shaped cross section to extend longitudinally parallel relative to the rail, and clamping means detachably connected with the end of the lower limb of the body member and adapted to engage and hold the bracket in position relative to the rail.

2. The support bracket of claim 1 including a notch adjacent the lower limb to receive one side of the lower flange of the I-beam rail, said clamping means forming a facing notch to receive the other side of said lower flange of said I-beam rail.

3. The support bracket of claim 1 wherein said bracket is made of fiberglass reinforced polymerized resin.

4. The support bracket of claim 1 and further comprising a cover member secured to the flanges extending from the upper limb and the vertical support to limit access to said rail through an opening at one side thereof.

5. A support bracket to be clamped to the contact rail of electric railroads for supporting protective covers comprising: a body member having a pair of parallel spaced C-shaped members adapted to extend transversely to a longitudinally extending contact rail, each of said C-shaped members having upper and lower limbs held in vertically spaced relationship to each other by a vertical support, said C-shaped members being joined to each other by a web to form a generally U-shaped cross section substantially continuously through out the length of said C-shaped body member, said U-shaped cross section forming a channel opening outwardly away from a rail when the bracket is attached thereto, all portions of said channel opening horizontally to one side of said body member, a pair of flanges extending in opposite directions from the ends of the legs of said U-shaped cross section for substantially all of the length of said body member, and clamping means detachably connected with the distal end of the lower limb of the body member and adapted to engage and hold the bracket in position relative to a rail.

6. The support bracket of claim 5 wherein said web is in engagement with the rail when said bracket is attached thereto.

7. A support bracket as set forth in claim 5 and further comprising a cover member fastened to at least one flange portion extending from the upper limb and from said vertical support.

8. A cover structure to be supported to cover the top and the side of a flanged contact rail of electric railroads comprising: a bracket member having upper and lower horizontally extending limbs held in vertically spaced relationship to each other by a vertical support portion to form a generally C-shape, said bracket member being adapted to be disposed transversely of a rail with a lower limb in engagement with an underside of the rail and the upper limb in spaced relationship to the top of the rail, the body member having U-shaped cross sections throughout the body member forming a channel opening radially outwardly relative to the rail, a pair of aligned flanges projecting in opposite directions from the ends of the legs of the U-shaped cross section to extend longitudinally parallel relative to the rail, and clamping means detachably connected with the end of the lower limb of the body member, said body member and clamping means forming opposite notches adapted to engage opposite sides of a flange of the contact rail to hold the bracket member in position relative to the rail, and a cover member attached to one of said flanges extending from said upper limb and vertical support portion.

* * * * *